United States Patent
Reinstädtler et al.

(10) Patent No.: US 7,657,947 B2
(45) Date of Patent: Feb. 2, 2010

(54) METHOD AND DEVICE FOR THE CONTACTLESS EXCITATION OF TORSIONAL VIBRATIONS IN A ONE-SIDEDLY CLAMPED-IN SPRING CANTILEVER OF AN ATOMIC FORCE MICROSCOPE

(75) Inventors: Michael Reinstädtler, Sulzbach (DE); Volker Scherer, Köln (DE); Walter Arnold, Saarbrücken (DE)

(73) Assignee: Fraunhofer-Gesellschaft zur Förderung, Munich (DE)

( * ) Notice: Subject to any disclaimer, the term of this patent is extended or adjusted under 35 U.S.C. 154(b) by 415 days.

(21) Appl. No.: 10/556,792
(22) PCT Filed: May 7, 2004
(86) PCT No.: PCT/EP2004/004876
§ 371 (c)(1), (2), (4) Date: Dec. 28, 2006
(87) PCT Pub. No.: WO2004/102583
PCT Pub. Date: Nov. 25, 2004

(65) Prior Publication Data
US 2007/0089497 A1 Apr. 26, 2007

(30) Foreign Application Priority Data
May 15, 2003 (DE) .................. 103 21 931

(51) Int. Cl.
G12B 21/00 (2006.01)
G01N 13/16 (2006.01)

(52) U.S. Cl. ............... 850/33; 73/105; 850/63
(58) Field of Classification Search ............ 73/105, 73/662; 850/1, 8, 33, 52, 63
See application file for complete search history.

(56) References Cited
U.S. PATENT DOCUMENTS
3,001,439 A * 9/1961 Rouy .................. 356/367
(Continued)

FOREIGN PATENT DOCUMENTS
DE 43 24 983 C2 2/1995
(Continued)

OTHER PUBLICATIONS
Rabe et al., "Vibrations of free and surface-coupled atomic force microscope cantilevers: Theory and experiment", Sep. 1996, Review of Scientific Instruments, vol. 67, Issue 9, pp. 3281-3293.*
(Continued)

Primary Examiner—Thomas P Noland
(74) Attorney, Agent, or Firm—Antonelli, Terry, Stout & Kraus, LLP.

(57) ABSTRACT

A method for exciting free torsional vibrations a spring cantilever, which is clamped in on one side and has a longitudinal extension, of an atomic force microscope (AFM) is disclosed. The invention provides by the one-sidedly clamped-in spring cantilever being placed at a distance over a surface between which and the spring cantilever there is an acoustic coupling medium, by the surface being set into oscillations which are oriented laterally to the surface and are polarized linearly along an oscillation direction, and by the polarization axis given by the oscillation direction being oriented perpendicular to the longitudinal extension of the spring cantilever.

37 Claims, 1 Drawing Sheet

U.S. PATENT DOCUMENTS

| | | | | |
|---|---|---|---|---|
| 5,266,896 | A | * | 11/1993 | Rugar et al. ............... 324/307 |
| 5,436,448 | A | * | 7/1995 | Hosaka et al. ................ 850/1 |
| 5,459,939 | A | * | 10/1995 | Kubo et al. .................. 33/542 |
| 5,656,809 | A | * | 8/1997 | Miyashita et al. .......... 250/225 |
| 5,723,775 | A | * | 3/1998 | Watanabe et al. ............ 73/105 |
| 5,777,977 | A | * | 7/1998 | Fujiwara et al. ............ 369/126 |
| 5,804,708 | A | | 9/1998 | Yamanaka et al. |
| 5,852,233 | A | * | 12/1998 | Arnold et al. ................ 73/105 |
| 5,880,360 | A | * | 3/1999 | Hu et al. ..................... 73/105 |
| 6,330,824 | B1 | * | 12/2001 | Erie et al. .................... 73/105 |
| 6,349,591 | B1 | * | 2/2002 | Fretigny et al. .............. 73/105 |
| 7,360,404 | B2 | * | 4/2008 | Reinstadtler et al. ......... 73/105 |

FOREIGN PATENT DOCUMENTS

WO     WO 2004018963 A2 * 3/2004

OTHER PUBLICATIONS

Kawagishi, T. et al: "Mapping of lateral vibration of the tip in atomic force microscopy at the torsional resonance of the cantilever", Ultramicroscopy Elsevier Netherlands, vol. 91, No. 1-4, May 2002, pp. 37-48, XP002294882 ISSN: 0304-3991.

Degertekin, F. L, et al: "Actuation and characterization of atomic force microscope cantilevers in fluids by acoustic radiation pressure", Applied Physics Letters, American Institute of Physics, New York, US, vol. 78, No. 11, Mar. 12, 2001, pp. 1628-1630, XP012027544, ISSN: 003-6951.

Scherer, V., et al: Local elasticity and lubrication measurements using atomic force and friction force microscopy at ultrasonic frequencies, IEEE Transactions on Magnetics, IEEE Inc., New York, US, vol. 33, No. 5, Pt2, Apr. 1, 1997, pp. 4077-4079, XP001104010 ISSN: 0018-9464.

Nakano, S. et al: "Evaluation of the elastic properties of a cantilever using resonant frequencies", Japanese Journal of Applied Physics, Part 1 (Regular Papers, Short Notes & Review Papers) Publication Office, Japanese Journal Appl. Phys. Japan, vol. 36, No. 58, May 30, 1997, pp. 3265-3266, XP002294883, ISSN: 0021-4922.

* cited by examiner

METHOD AND DEVICE FOR THE CONTACTLESS EXCITATION OF TORSIONAL VIBRATIONS IN A ONE-SIDEDLY CLAMPED-IN SPRING CANTILEVER OF AN ATOMIC FORCE MICROSCOPE

BACKGROUND OF THE INVENTION

1. Field of the Invention

The present invention relates to a method for excitation of free torsional vibrations in a spring cantilever, which is clamped in on one side and has a longitudinal extension, of an atomic force microscope (AFM).

2. Description of the Prior Art

The development of the AFM has led to great achievements in the field of surface property examination, particularly in the characterization of surface properties. For the first time, it has became possible to obtain information about surfaces and close-to-the-surface regions of very diverse samples with nanometer resolution, even for magnitudes of single atoms. With the aid of the friction microscope developed from the atomic force microscope or the lateral force microscope, it became possible for the first time to examine one of the oldest phenomena in technology on this scale, friction.

DE 43 24 983 C2 describes an acoustic microscope which operates on the technological basis of an atomic force microscope and is able to measure the elasticity properties of the surface sample. The atomic force microscope has a spring cantilever designed as a leaf spring, usually having a length of between 100 μm and 500 μm, at the one end of which is attached a pyramid-shaped measuring tip having a tip curvature radius of about 50 nanometers is attached.

In order to measure and detect the whole sample surface, the surface of the sample is scanned by the spring cantilever and the measuring tip connected thereto with the aid of a suitable movement device in such a manner that the measuring tip comes in contact with the sample surface at each single scanning point with a given pressure. The degree that the spring cantilever bends can be determined with the aid of an optical sensor unit thereby permitting detection of the topographical excursion of the measuring tip. The optical sensor unit usually provides a laser diode from which is emitted a laser beam directed at the spring cantilever, is reflected at the spring cantilever and is detected by a position-sensitive photodiode. During scanning, the spring cantilever including the measuring tip actively traces a loop in such a manner that the excursion and the pressure remained constant with which the spring cantilever rests on the surface of a sample surface via the measuring tip. The normal voltage required for the excursion is usually converted into a distance value and, encoded as a color value accordingly plotted in a representation showing the surface topography.

In order to, in addition, determine the elasticity properties of the sample surface, an ultrasonic wave generator is provided, which sets the surface of the sample into oscillations while the measuring tip rests at a scanning point on the sample surface. The oscillation excitation by coupling in ultrasonic waves leads to normal oscillations of the surface of the sample which sets the spring cantilever into high-frequency oscillating bending vibrations along its extension.

Detecting the ultrasound-induced, high-frequency vibration behavior of the spring cantilever permits gaining information about the elasticity properties, in particular in the case of a spring cantilever executing normal vibrations on the compression stiffness of the sample surface. Further details are found in the previously mentioned DE 43 24 983 C2.

In contrast to the aforedescribed resonance measurement with vertical oscillation modulation, that is the to-be-examined sample surface is set into normal oscillations, U.S. Pat. No. 5,804,708 describes an atomic force microscope, although with a similar buildup but oscillation excitation of the to-be-examined sample surface occurs with the aid of a signal generator in such a manner that the sample surface executes oscillations that are oriented lateral to the sample surface, with the oscillations directed, in particular, transverse in relation to the longitudinal extension of the spring cantilever.

Due to the oscillation excitation directed transverse to the longitudinal extension of the spring cantilever, the spring cantilever is set into torsional vibrations via the measuring tip which is in contact with the sample surface, with the measuring tip which is at least at times in contact with the sample surface executing vibrations which are directed in longitudinal direction of the sample surface. The vibrations are directed transverse to the longitudinal extension of the spring cantilever, and are polarized. At the points of reversal of the vibrations, the measuring tip briefly adheres to the sample surface, which is deformed by the shear forces acting laterally on the sample surface, until the measuring tip slips back over the sample surface from this situation, which is described by friction.

The shear deformations formed dependent on the pressure with which the measuring tip rests on the sample surface influence the vibration behavior of the measuring tip and the spring cantilever connected thereto in a manner which characterizes the elasticity properties of the sample surface. In this way it is possible to obtain information about the elasticity properties, in particular about the shear contact stiffness of the sample surface from the vibration behavior, for example from the vibration amplitude, the vibration frequency and/or the vibration frequency phase of the vibrations developing in the form of torsional vibrations along the spring cantilever.

In the dynamic friction microscopy, one must fundamentally differentiate between two types of operation. The simpler type of operation relates to the excitation of the spring cantilever below its vibration resonance. This type of operation is used for detecting friction at high relative velocities between the measuring tip and the sample surface to determine the viscous-elasticity properties of the sample materials. The amplitude and/or the phase shift of the vibration of the spring cantilever in relation to the excitation vibration is recorded and evaluated accordingly.

The other type of operation provides for vibration excitation of the spring cantilever at its vibration resonance. Thus, for instance, the position of the resonance frequency of the torsional vibration of the spring cantilever depends on the friction force acting between the measuring tip and the sample surface. Furthermore, the friction force is influenced by the elasticity properties of the materials of the scanning tip and of the sample.

In the latter type of operation, only the position of the resonance of the spring cantilever is examined, but not the absolute torsional vibration amplitude as in the first case. If the length, width and thickness of the spring cantilever and the length of the measuring tip and the elastic constants of the spring cantilever material and its density are known, the so-called lateral contact stiffness or shear-contact stiffness can be calculated from the torsional resonance frequency.

Similar to the preceding method, the vertical or compression contact stiffness can be determined from the bending resonances of the spring cantilever. Experience has taught that precise determination of compression contact stiffness is not possible via the absolute position of the contact resonance, but rather via its shift in relation to the corresponding freely bending resonance of the one-sidedly clamped-in spring cantilever.

An oscillation element, which is placed on the suspension of the one-sidedly clamped-in spring cantilever and excites the spring cantilever to vertically polarized bending vibrations, can be employed to determine the freely bending resonances. However, it has proven to be useful to carry out excitement via a oscillation element, which is placed under the to-be-examined sample and by means of which the sample surface is set into vertical vibrations. Also see U. Rabe, K. Janser, W. Arnold, Rev. Sci Instrum. 67(1997)3281. Longitudinal waves, which propagate through the air, are generated above the sample due to the normal vibrations of the sample surfaces. The spring cantilever, which is clamped in on one side and is held at a distance from the vibrating surface, is set into bending vibration by the sound waves which begin to resonate at a corresponding excitation frequency, the resonance frequencies of which are exactly measurable.

As in the preceding case of measuring the compression contact stiffness, it is also advantageous for determining the shear contact stiffness not to determine the absolute torsional resonance frequency of the spring cantilever but rather to determine its shift in relationship to the corresponding free torsional resonance. The free resonance can be excited with a shear oscillator element which is placed on the suspension of the one-sidedly clamped-in spring cantilever, as described in an article by S. Nakanao, R. Maeda, K. Yamanaka, Jpn. J. Appl. Phys. 36(1997) 3265.

This approach, however, has a number of drawbacks:

1. The oscillation elements on the suspension of the spring cantilever have to be miniaturized due to the their small volume. The miniaturized oscillation elements cannot be designed for a large frequency band width. Moreover, such type miniaturized elements interfere with the natural resonances, leading to misinterpretation of the contact resonances.

2. Due to the cross coupling effects, excitation via the suspension of the spring cantilever also leads to excitation of undesirable bending vibrations of the spring cantilever. Coupled, non-linear modes may also crop up which make analysis more difficult if not impossible.

3. Commercially available devices require complicated, time-consuming setting up, thereby increasing costs.

SUMMARY OF THE INVENTION

The present invention provides a method for exciting free torsional vibrations in a spring cantilever, which is clamped in on one side and has a longitudinal extension, of an atomic force microscope (AFM) in such a manner that the preceding drawbacks are avoided. In particular, the aim is to examine the free torsional resonance behavior of the spring cantilever using as simple as possible and inexpensive as possible means. The measures to be taken should preferably be applicable without much effort in all the atomic force microscopes operating on a friction force principle already in use.

A key element of the invention is that a method for exciting free torsional vibrations in a spring cantilever, which is clamped in on one side and has an longitudinal extension, of an atomic force microscope (AFM) is further developed in such a manner that the one-sidedly clamped-in spring cantilever is placed at a distance, thus contactless, in relation to a surface provided between which and the spring cantilever there is an acoustic coupling medium. Preferably, a gaseous medium is suited for this purpose, in the simplest case the surrounding air at normal pressure and temperature conditions. The surface over which the one-sidedly clamped-in spring cantilever is placed at a distance is set into oscillations which are oriented lateral to the surface and are linearly polarized along a oscillation direction. The polarization axis given by the oscillation direction of the surface is oriented perpendicular to the longitudinal extension of the spring cantilever.

It has proven that, due to the aforedescribed lateral oscillations of the surface, shear forces are conveyed via the coupling medium between the surface and the one-sidedly clamped-in spring cantilever to the latter in such a manner that the spring cantilever is excited to execute torsional vibrations. This excitation process permits selective excitation to torsional vibrations inside the spring cantilever even if the spring cantilever is located a few centimeters, that is usually up to a maximum of 5 to 6 cm above the laterally oscillating surface, and the acoustic coupling medium predominating between the surface and the spring cantilever is the surrounding air.

Even if contactless vibration excitation of a one-sidedly clamped-in spring cantilever executing free bending resonances with the aid of the sound waves acting for the most part orthogonally on the spring cantilever due to local differences in sonic pressure described in the prior art may be considered in an easily comprehendible manner as an excellent means of exciting vibration, the active mechanisms on which the invented method is based are not obvious. Therefore it is surprising that a pocket of air enclosed between the laterally vibrating surface and the spring cantilever is able to convey shear forces in such an effective, contactless manner to the one-sidedly clamped-in spring cantilever placed at a distance above the surface that the spring cantilever is excited to execute torsional vibrations with detectable amplitudes.

On the basis of this understanding, it is furthermore preferably possible, by raising the air pressure conditions or by using suitable alternative gases, having, for example compared to air molecules, heavier gas components or even liquid media, to improve the vibration excitation mechanism, even if excitation of free torsional resonance vibrations inside the one-sidedly clamped-in spring cantilever is possible under normal air pressure conditions.

In order to excite free resonant torsional vibrations of the spring cantilever, it is necessary to vary the frequencies of the surface set into lateral oscillations within a oscillation frequency range containing resonant torsional oscillations of the freely vibrating spring cantilever. If resonant vibration excitation occurs, resonant torsional vibration exaggerations occur at the cantilever, which can be used as a basis for determining the shear contact stiffness of the sample surfaces.

In order to keep the device and method for resonant excitation of torsional vibrations in a one-sidedly clamped-in spring cantilever of an atomic force microscope as simple and inexpensive as possible, the to-be-examined sample surface whose shear contact stiffness and/or whose friction properties are to be determined can be utilized as the laterally oscillating surface to determine the free torsional vibration resonances of the spring cantilever. Such a type measuring arrangement is elucidated in detail in the preferred embodiment described in the following.

In order to detect the vibrations executed by the spring cantilever, in particular torsional vibrations, a light-aided measuring sensor which is able to detect the vibration behavior of the spring cantilever without contact is used in an as such known manner as is known from state-of-the-art scanning microscope technology. An alternative for detecting the vibration behavior of the spring cantilever, that is regarding amplitude, phase or vibration direction is to use a spring cantilever made of a piezoelectric material, it being possible to detect and evaluate accordingly by suited voltage tapping the electrical voltage variations of the spring cantilever caused by deformation.

When the free torsional vibration resonances have been determined in the aforedescribed manner, measuring the shear contact stiffness, and measuring additional tribological properties of the sample surface can be carried out by simply lowering the spring cantilever onto the to-be-examined sample surface in such a manner that the measuring tip placed on the spring cantilever comes into contact with the sample surface.

BRIEF DESCRIPTION OF THE DRAWINGS

The present invention is described in the following by way of example without the intention of limiting the scope or spirit of the overall inventive idea using preferred embodiments with reference to the accompanying drawings.

DESCRIPTION OF THE PREFERRED EMBODIMENTS

Figure 1:
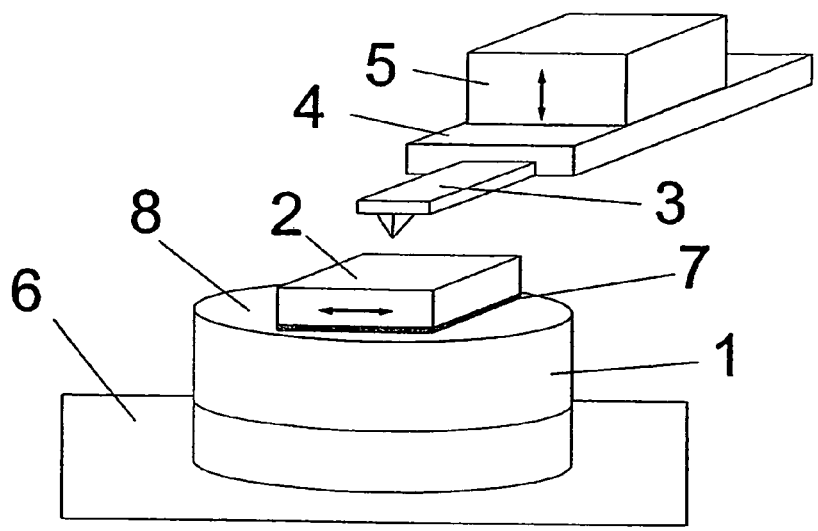
FIG. 1 shows a schematic measuring setup for the excitation of free torsional vibrations of a spring cantilever and FIG. 2 a representation of a measuring diagram.

FIG. 1 shows a schematic setup of all the components for exciting a one-sidedly clamped-in spring cantilever 3, which is placed on a suspension 4, for executing free torsional resonant vibrations.

Attached to a suitably designed support 6, and holder, is a shear oscillator element 1 which preferably is made of a piezoelectric material and can be set into oscillations by means of suitable electric excitation in such a manner that the surface 8 of the shear oscillator element 1 is set in lateral oscillations which are linearly polarized along an oscillation direction. On the surface 8 of the shear oscillator element 1 is placed a to-be-examined sample 2 by means of a suitable coupling means 7, for example an adhesive layer, which like the surface 8 is excited to lateral, linearly polarized oscillations (see arrow in FIG. 1).

Positioned at a distance from the sample surface of the sample 2 is the spring cantilever 3 at whose free end a measuring tip is placed. The spring cantilever is coupled on one side to a suspension 4. Usually, the spring cantilever has a length of up to 600 μm and a width of up to 80 μm and is placed at a distance from a few micrometers to a few centimeters (maximally 4 to 6 cm) from the sample surface of sample 2. The spring cantilever 3 is aligned in such a manner that its longitudinal axis points perpendicular to the oscillation direction or to the polarization of the shear oscillator element 1. Purely optionally, the suspension 4 can in addition be provided with a thickness oscillator 5, which can set the spring cantilever 3 into bending vibrations for combination examinations.

Due to the effect described in the introduction of conveying shear forces via the air present between the sample surface and the spring cantilever 3, the spring cantilever 3 is set into torsional vibrations via the surface of sample 2 which is oscillating in the plane and via the surface of the shear oscillator element 1.

In a particularly preferred embodiment, it is at least provided that the surface 8 of the shear oscillator element 1 is larger than the projection of that area on the surface 8 covered by the spring cantilever 3. It is just as advantageous to dimension the sample surface of sample 2 larger than the perpendicular projection of the spring cantilever area over the sample surface of sample 2. It is also advantageous to select the lateral sample dimensions 2 smaller than the surface 8 of the shear oscillator element 1 as shown in FIG. 1 so that the sample 2 rises with is sample side walls over the surface 8.

Not depicted in FIG. 1 is the measuring sensor system with which the vibration behavior of the spring cantilever 3 is detected. For this refer to the prior art technology for contactless detection of vibration behavior of the spring cantilever, for example using a light-aided measuring sensor.

Figure 2:
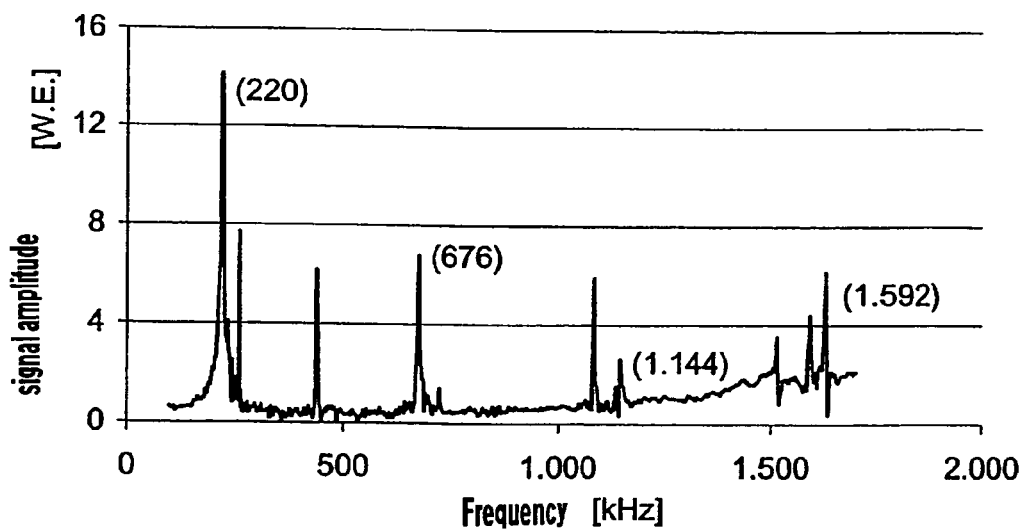

If the shear oscillator element 1 is excited with a sinusoidal-shaped electrical voltage with a constant amplitude and at the same time the excitation frequency is continuously varied while the amplitude of the torsional vibration of the spring cantilever is recorded, a vibration spectrum, such as is shown in FIG. 2, is obtained along whose abscissa the vibration frequencies and along whose ordinates the signal amplitudes are plotted. Thus the vibration spectrum shows the discrete resonances whose positions are characteristic of a spring cantilever 3 having certain geometric dimensions and a certain shear modulus.

From the free torsional resonances, in particular in conjunction with the free bending resonances, which can be induced by the thickness oscillator 5, occurring preferably temporally separate from detecting the torsional resonances, it is possible to obtain the effective geometric data of the spring cantilever 3 needed to obtain quantitative information about the elastic and/or friction properties of the to-be-examined sample 2.

Moreover, with the aid of the free torsional modes and the free bending modes it is possible to check in a very short time whether the spring cantilever 3 corresponds to the general model of a bending cantilever and whether it can be used for quantitative measurements at all.

The free resonance frequency can also be used to obtain information about the spring cantilever, such as for example its geometry, elasticity, vertical and lateral spring constants.

LIST OF REFERENCES 1 shear oscillator element
2 sample
3 spring cantilever
4 suspension
5 thickness oscillator
6 holding means
7 coupling means
8 surface of the shear oscillator element 1

What is claimed is:

1. A method in an atomic force microscope having a spring cantilever with a longitudinal extension and clamped on one side for exciting free torsional vibrations in the spring cantilever comprising:
   spacing the spring cantilever at least a plurality of microns over and separated from a surface by a gaseous acoustic coupling medium; and
   setting the surface into oscillation with oscillations oriented parallel to the surface and polarized perpendicular to the longitudinal extension of the spring cantilever so that the free torsional vibrations are excited in the spring cantilever, without contact, by shear forces emitted by the surface into the gaseous acoustic medium.

2. The method according to claim 1, wherein air is the gaseous medium.

3. A method in accordance with claim 2 wherein the air is atmospheric air.

4. A method according to claim 3, wherein the spring cantilever has an area projecting on the surface which area is at least partly surrounded by the surface at least at a free end of the spring cantilever.

5. The method according to claim 2, wherein the surface is set into oscillation with an oscillation frequency varied within a frequency range in which occur the resonant torsional vibrations of the freely vibrating spring cantilever.

6. A method according to claim 5, wherein the spring cantilever has an area projecting on the surface which area is at least partly surrounded by the surface at least at a free end of the spring cantilever.

7. The method according to claim 2, wherein the spring cantilever has a length of up to 600 μm and width of up to 80 μm.

8. A method according to claim 7, wherein the spring cantilever has an area projecting on the surface which area is at least partly surrounded by the surface at least at a free end of the spring cantilever.

9. The method according to claim 2, wherein the oscillating surface is a sample surface which is to be examined by the atomic force microscope and which is coupled to a shear oscillator element for oscillation excitement of the surface and over which is positioned the spring cantilever which is equipped with a measuring tip.

10. A method according to claim 9, wherein the spring cantilever has an area projecting on the surface which area is at least partly surrounded by the surface at least at a free end of the spring cantilever.

11. The method according claim 2, wherein the spring cantilever is excited to vibrate without contact by shear waves radiated from the surface into the acoustic coupling medium with the vibrations of the spring cantilever being detected sensorially.

12. A method according to claim 11, wherein the spring cantilever has an area projecting on the surface which area is at least partly surrounded by the surface at least at a free end of the spring cantilever.

13. A method according to claim 2, wherein the spring cantilever has an area projecting on the surface which area is at least partly surrounded by the surface at least at a free end of the spring cantilever.

14. The method according to claim 1, wherein the surface is set into oscillation with an oscillation frequency varied within a frequency range in which occur resonant free torsional vibrations of the vibrating spring cantilever.

15. The method according to claim 14, wherein the oscillating surface is a sample surface which is to be examined by the atomic force microscope and which is coupled to a shear oscillator element for oscillation excitement of the surface and over which is positioned the spring cantilever which is equipped with a measuring tip.

16. A method according to claim 15, wherein the spring cantilever has an area projecting on the surface which area is at least partly surrounded by the surface at least at a free end of the spring cantilever.

17. The method according claim 14, wherein the spring cantilever is excited to vibrate without contact by shear waves radiated from the surface into the acoustic coupling medium without a contact with the vibrations of the spring cantilever being detected sensorially.

18. A method according to claim 17, wherein the spring cantilever has an area projecting on the surface which area is at least partly surrounded by the surface at least at a free end of the spring cantilever.

19. A method according to claim 14, wherein the spring cantilever has an area projecting on the surface which area is at least partly surrounded by the surface at least at a free end of the spring cantilever.

20. The method according to claim 1, wherein the spring cantilever has a length of up to 600 μm and width of up to 80 μm.

21. The method according to claim 20, wherein the oscillating surface is a sample surface which is to be examined by an atomic force microscope and which is coupled to a shear oscillator element for oscillation excitation and over which is positioned the spring cantilever which is equipped with a measuring tip.

22. A method according to claim 21, wherein the spring cantilever has an area projecting on the surface which area is at least partly surrounded by the surface at least at a free end of the spring cantilever.

23. The method according claim 20, wherein the spring cantilever is excited to vibrate without contact by shear waves radiated from the surface into the acoustic coupling medium without a contact with the vibrations of the spring cantilever being detected sensorially.

24. A method according to claim 23, wherein the spring cantilever has an area projecting on the surface which area is at least partly surrounded by the surface at least at a free end of the spring cantilever.

25. A method according to claim 20, wherein the spring cantilever has an area projecting on the surface which area is at least partly surrounded by the surface at least at a free end of the spring cantilever.

26. The method according to claim 1, wherein the oscillating surface is a sample surface which is to be examined by the atomic force microscope and which is coupled to a shear oscillator element for oscillation excitement of the surface and over which is positioned the spring cantilever which is equipped with a measuring tip.

27. A method according to claim 26, wherein the spring cantilever has an area projecting on the surface which area is at least partly surrounded by the surface at least at a free end of the spring cantilever.

28. The method according claim 1, wherein the spring cantilever is excited to vibrate without contact by shear waves radiated from the surface into the acoustic coupling medium with the vibrations of the spring cantilever being detected sensorially.

29. The method according to claim 28, wherein the vibrations of the spring cantilever are detected, without a contact, with respect to an amplitude, phase and/or vibration direction thereof with a measuring sensor using light.

30. A method according to claim 29, wherein the spring cantilever has an area projecting on the surface which area is at least partly surrounded by the surface at least at a free end of the spring cantilever.

31. The method according to claim 28, wherein the vibrations of the cantilever are detected with respect to an amplitude, phase and/or vibration direction thereof with a piezoelectric spring cantilever.

32. A method according to claim 31, wherein the spring cantilever has an area projecting on the surface which area is at least partly surrounded by the surface at least at a free end of the spring cantilever.

33. A method according to claim 28, wherein after detection of the free torsional vibration of the spring cantilever, a measuring tip of the spring cantilever is lowered to the surface to measure a shear contact stiffness and/or tribological properties of the surface.

34. A method according to claim 33, wherein the spring cantilever has an area projecting on the surface which area is at least partly surrounded by the surface at least at a free end of the spring cantilever.

35. A method according to claim 28, wherein the spring cantilever has an area projecting on the surface which area is at least partly surrounded by the surface at least at a free end of the spring cantilever.

36. A method according to claim 1, wherein the spring cantilever has an area projecting onto the surface which area is at least partly surrounded by the surface at least at a free end of the spring cantilever.

37. A method according to claim 36, wherein the spring cantilever has an area projecting on the surface which area is at least partly surrounded by the surface at least at a free end of the spring cantilever.

* * * * *